(12) United States Patent
Murdoch

(10) Patent No.: US 11,305,308 B2
(45) Date of Patent: Apr. 19, 2022

(54) INJECTION MOLDING TOOL AND METHOD

(71) Applicant: Illinois Tool Works Inc., Glenview, IL (US)

(72) Inventor: Thomas Murdoch, Warooka (AU)

(73) Assignee: Illinois Tool Works Inc., Glenview, IL (US)

( * ) Notice: Subject to any disclaimer, the term of this patent is extended or adjusted under 35 U.S.C. 154(b) by 191 days.

(21) Appl. No.: 15/746,272

(22) PCT Filed: Aug. 3, 2016

(86) PCT No.: PCT/US2016/045224
§ 371 (c)(1),
(2) Date: Jan. 19, 2018

(87) PCT Pub. No.: WO2017/023959
PCT Pub. Date: Feb. 9, 2017

(65) Prior Publication Data
US 2018/0221900 A1 Aug. 9, 2018

(30) Foreign Application Priority Data

Aug. 5, 2015 (AU) .............................. 2015903128
Aug. 1, 2016 (AU) .............................. 2016210598

(51) Int. Cl.
*B05B 11/02* (2006.01)
*B05C 17/005* (2006.01)
(Continued)

(52) U.S. Cl.
CPC ........ *B05B 11/02* (2013.01); *B05C 17/00559* (2013.01); *B05C 17/00576* (2013.01);
(Continued)

(58) Field of Classification Search
CPC ......... B05B 11/02; B29C 45/44; B29C 45/33; B29C 45/26; B29C 2045/338; B05C 17/00559; B05C 17/00576; B65D 83/0005
See application file for complete search history.

(56) References Cited

U.S. PATENT DOCUMENTS

| 4,998,461 A | 3/1991 | Ishiwata et al. |
| 2002/0153391 A1* | 10/2002 | Prestele ............ B05C 17/00579 222/326 |

(Continued)

FOREIGN PATENT DOCUMENTS

| EP | 0 747 114 | 12/1996 |
| EP | 1 172 154 | 1/2002 |

(Continued)

OTHER PUBLICATIONS

International Search Report and Written Opinion from International Patent Application No. PCT/US2016/045224, dated Oct. 17, 2016 (11 pages).

*Primary Examiner* — Francisco W Tschen
*Assistant Examiner* — Elisa H Vera
(74) *Attorney, Agent, or Firm* — Neal, Gerber & Eisenberg LLP

(57) ABSTRACT

A piston for use in a cartridge for dispensing multi-part fluids, the piston being injection molded and having integrally formed circumferential seals, wherein the piston is molded in the absence of a longitudinal parting line across the seals. A tool for forming a piston having a plurality of circumferential seals for use in a cartridge for dispensing multi-part fluids, the tool comprising a plurality of segments together defining a piston cavity corresponding to an outer periphery of the piston.

4 Claims, 10 Drawing Sheets

(51) Int. Cl.
*B65D 83/00* (2006.01)
*B29C 45/44* (2006.01)
*B29C 45/33* (2006.01)
*B29C 45/26* (2006.01)

(52) U.S. Cl.
CPC .............. *B29C 45/26* (2013.01); *B29C 45/33* (2013.01); *B29C 45/44* (2013.01); *B65D 83/0005* (2013.01); *B29C 2045/338* (2013.01)

(56) References Cited

U.S. PATENT DOCUMENTS

| | | | |
|---|---|---|---|
| 2006/0151530 | A1 | 7/2006 | Horner et al. |
| 2010/0147896 | A1* | 6/2010 | Obrist ............... B05C 17/00576 222/327 |
| 2012/0247323 | A1* | 10/2012 | Obrist ..................... B05B 11/02 92/175 |
| 2016/0288159 | A1* | 10/2016 | Seifer ................ B65D 83/0005 |
| 2017/0253411 | A1 | 9/2017 | Murdoch |

FOREIGN PATENT DOCUMENTS

| | | |
|---|---|---|
| EP | 1 679 126 | 7/2006 |
| EP | 2 143 662 | 1/2010 |
| FR | 2 809 229 | 11/2001 |
| WO | WO 95/05984 | 3/1995 |
| WO | WO 96/26064 | 8/1996 |
| WO | WO 2013/056872 | 4/2013 |

* cited by examiner

INJECTION MOLDING TOOL AND METHOD

PRIORITY CLAIM

This patent application is a national stage entry of PCT Application No. PCT/US2016/045224, which was filed on Aug. 3, 2016, which claims priority to and the benefit of Australian Patent Application No. 2016210598, which was filed on Aug. 1, 2016; and Australian Patent Application No. 2015903128, which was filed on Aug. 5, 2015, the entire contents of each of which are incorporated herein by reference.

FIELD

The present disclosure relates to a tool for forming a cartridge piston and method.

BACKGROUND

Sealing of cartridges used for multi-part fluids such as adhesives having a resin and catalyst, for example a masonry anchor cement, can be difficult as highly fluid components of resin and/or catalyst can be very fine in nature and find a path through the smallest gap between a seal and cartridge wall. As such, it is important that seals formed on the piston are optimally formed.

To provide a piston having such seals has previously been difficult and expensive as previous pistons have been formed by injection molding processes and then subjected to post-forming machining operations to obtain a piston having sealing edges which are formed of sufficient accuracy.

Examples of the present disclosure seek to solve, or at least ameliorate, one or more disadvantages of previous pistons.

SUMMARY

According to one aspect of the present disclosure, there is provided a piston for use in a cartridge for dispensing multi-part fluids, the piston being injection molded and having integrally formed circumferential seals, wherein the piston is molded in the absence of a longitudinal parting line across the seals.

According to a preferred embodiment of the present disclosure, the piston has forward and rearward circumferential seals and the forward seal has an annular deflection member extending therefrom, the deflection member being configured to deflect radially inward to inwardly deflect the forward seal to assist in removal from an injection molding tool.

According to another aspect of the present disclosure, there is provided a tool for forming a piston having a plurality of circumferential seals for use in a cartridge for dispensing multi-part fluids, the tool comprising a plurality of segments together defining a piston cavity corresponding to an outer periphery of the piston, the segments including:

a central segment defining a generally cylindrical main body cavity for forming a circumferential portion of the piston, wherein a longitudinal axis of the central segment defines a tool draw axis;

a rearward segment for forming at least a rear end of the piston, the rearward segment being configured to engage the central segment to at least partially form a rearward sealing edge of a rearward seal on the piston;

a forward segment for forming at least a forward end of the piston;

at least a pair of intermediate segments disposed intermediate the forward segment and the central segment, a first intermediate segment being adjacent the forward segment and configured so that the forward segment and the first intermediate segment together form a deflection member, and a second intermediate segment being adjacent the central segment and configured so that the second intermediate segment and the rearward segment together form a first sealing edge on a periphery of a forward circumferential piston seal, wherein the forward, rearward and intermediate segments are axially movable along the longitudinal axis with respect to each other, and wherein a portion of the first intermediate segment is configured to extend behind the deflection member in the tool draw axis to form an undercut.

In a preferred form, the deflection member is annular and extends from the forward seal.

Preferably, a portion of the second intermediate segment is configured to extend behind the first sealing edge in the tool draw axis to form an undercut. Preferably, the first and second intermediate segments are separable in the longitudinal direction to facilitate removal of a formed piston by allowing for deflection of the first sealing edge during removal of the piston from the tool.

According to preferred embodiments of the present disclosure, the central segment is formed in two parts that meet in a longitudinal plane. Preferably, the rearward segment is formed in two parts that are separable to facilitate ejection of a formed piston from the tool.

Preferably, during separation of the first and second intermediate segments, the first intermediate section urges the deflection member radially inward to deflect the forward seal inwardly to allow removal of the second intermediate segment over the forward seal.

According to another aspect of the present disclosure, there is provided a method of forming a cartridge piston seal, comprising the steps of:

providing a tool of the above described type;

bringing the tool into a closed state defining a piston cavity;

injecting material into the piston cavity to form a piston; and allowing the material to at least partially cure.

The method can include the step of removing the forward and intermediate segments while the material is still elastically deformable to allow for flexing of portions of the piston formed with an undercut to permit passage of the intermediate sections.

The method can further comprise the step of separating the first and second intermediate segments by advancing the first intermediate segment a small distance to deflect the deflection member before together removing the first and second intermediate segments to allow removal of the formed piston.

BRIEF DESCRIPTION OF THE DRAWINGS

Preferred embodiments of the present disclosure will be further described, by way of non-limiting example only, with reference to the accompanying drawings in which.

DETAILED DESCRIPTION

Figure 1:
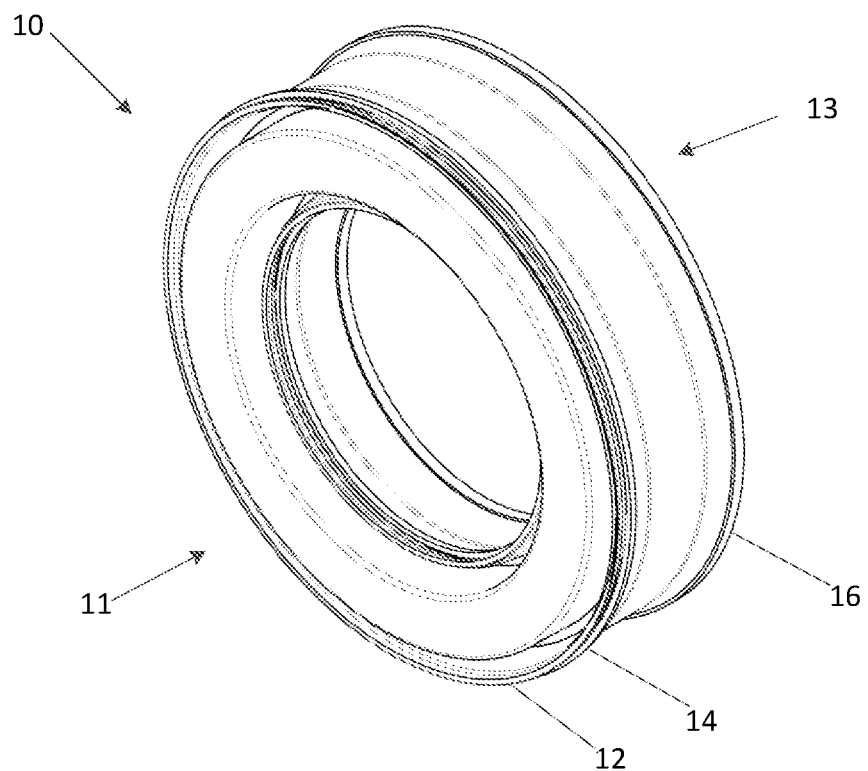
FIG. 1 is a perspective view of an outer piston formed with a tool and method of one embodiment of the present disclosure.

With reference to FIG. 1, there is shown a piston 10 according to a preferred embodiment of the present disclosure. The piston 10 is configured for use in a cartridge for dispensing multi-part fluids such as two-part adhesive masonry cement mixtures. The piston 10 is injection molded, has integrally formed circumferential seals and is molded in the absence of a longitudinal parting line across the seals.

Advantageously, the piston 10 can formed without parting lines that have an adverse effect on the sealing performance of the piston 10. Also, the piston 10 be manufactured without post-forming machining being required, thereby reducing manufacturing costs.

Figure 2:
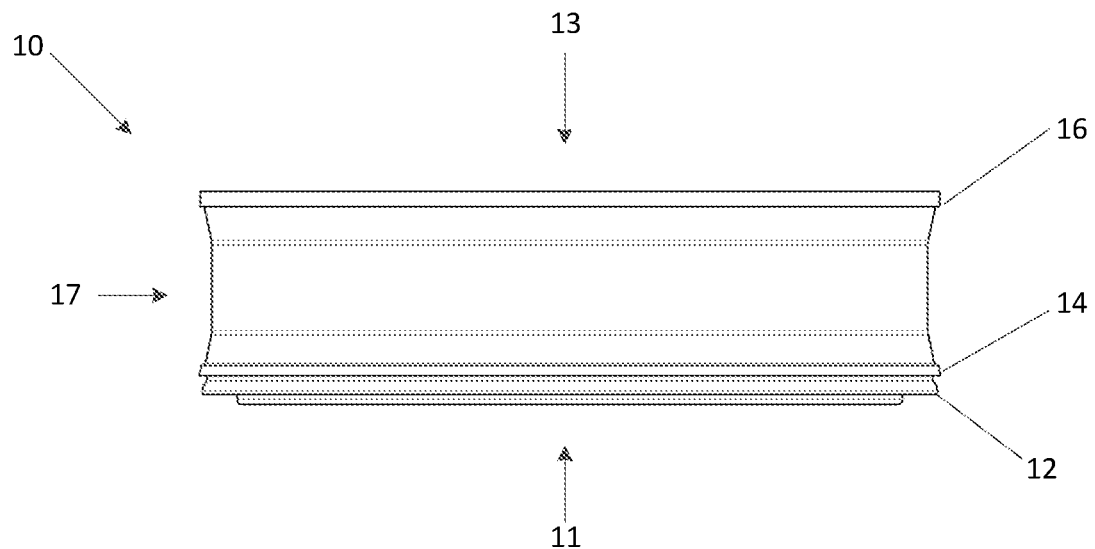
FIG. 2 is a side view of the piston of FIG. 1.
Figure 3:
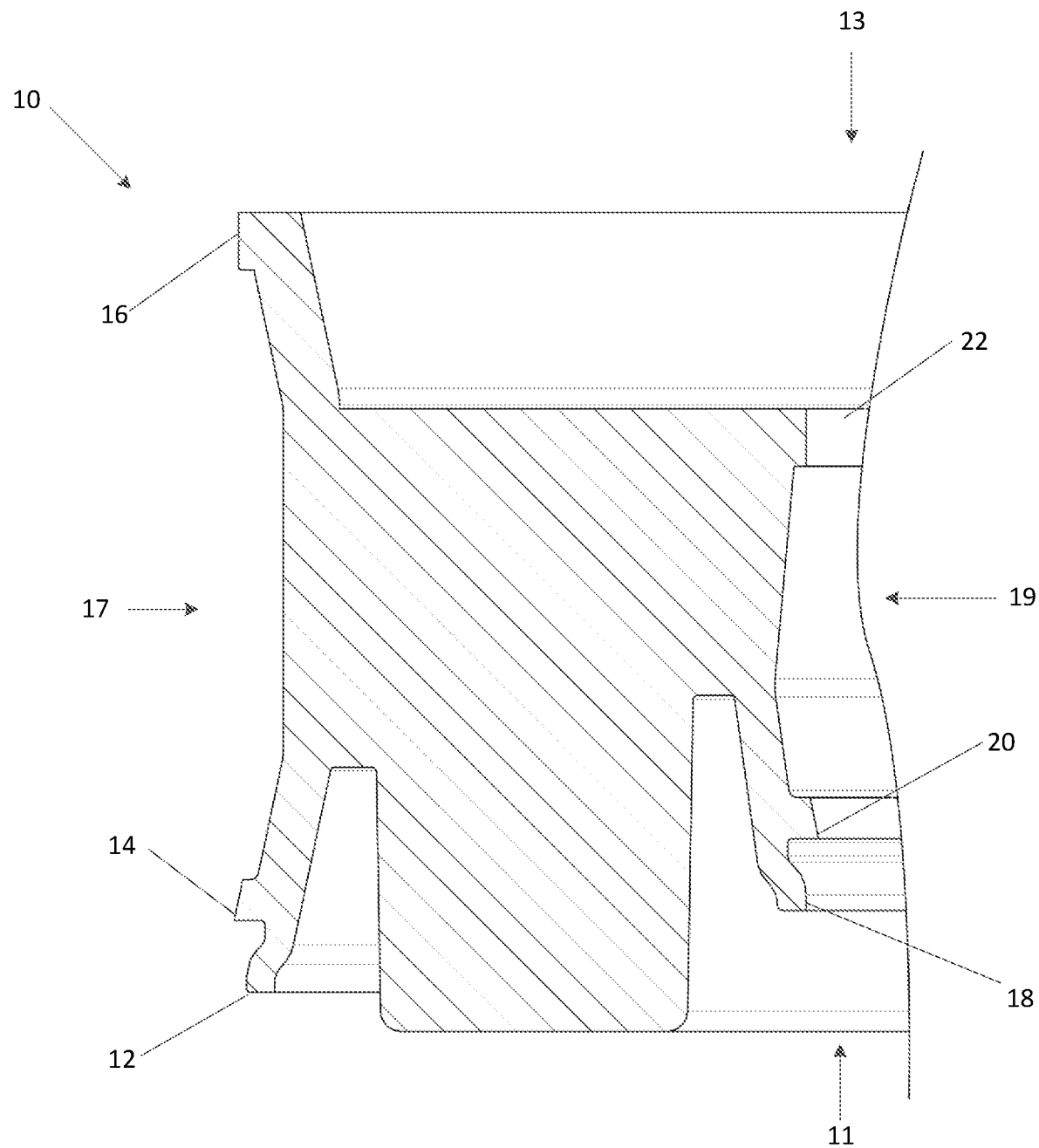
FIG. 3 is a close partial section view of the piston of FIG. 1.

The piston 10 has a forward end 11 which is forward most when used in a cartridge, and a rearward end 13 which is rearmost in use. The piston has, on an outer peripheral portion 17, a deflection member 12, a forward seal 14 and a rear seal 16, which can be more clearly seen in FIGS. 2 and 3.

The piston 10 is configured for use as an outer piston in a cartridge having coaxial reservoirs and has an inner portion 19 for engagement with a wall of the cartridge. The inner sealing portion 19 includes a deflection member 18, a forward seal 20 and a rear seal 22, each of which are similarly configured to seals 12, 14 and 16 on the outer peripheral portion 17. In an alternative form, the rear seal 22 or rear seal 16 could be omitted and the surface radiused.

The deflection member 18 is annular and extends from the forward seal 20. The deflection member 18 is configured to deflect radially inward to inwardly deflect the forward seal 20 to assist in removal from an injection molding tool.

Figure 4:
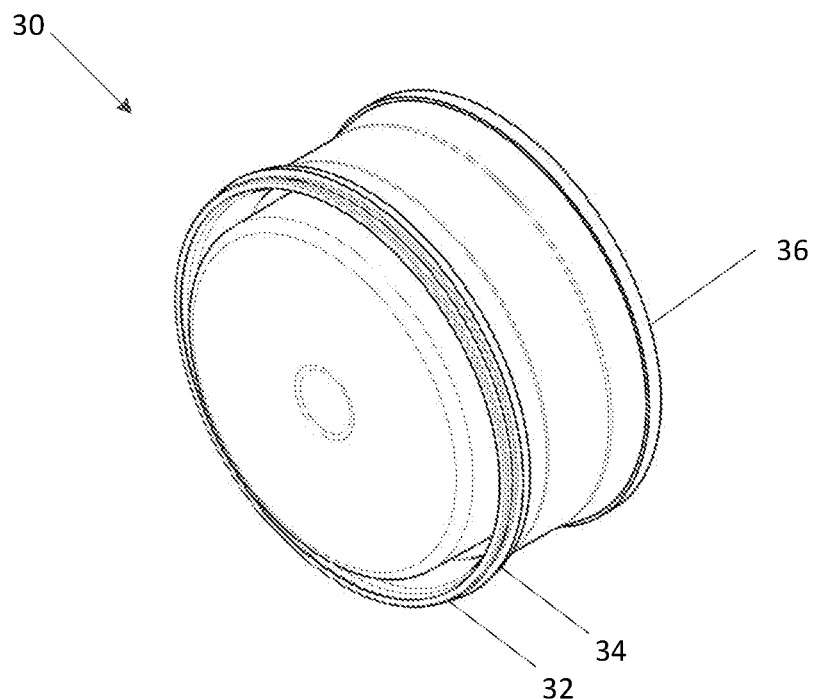
FIG. 4 is a perspective view of an inner piston formed with a tool and method of one embodiment of the present disclosure.
Figure 5:
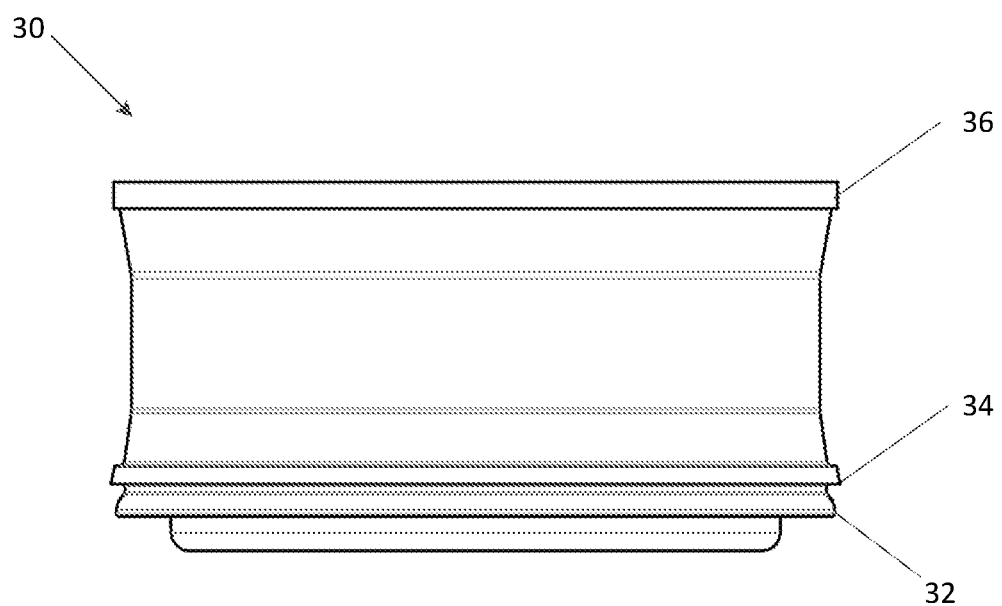
FIG. 5 is a side view of the piston of FIG. 4.

FIGS. 4 and 5 illustrate a second piston 30, configured for use as an inner piston in a cartridge having coaxial reservoirs. The piston 30 also includes a deflection member 32, a forward seal 34 and a rear seal 36.

Figure 6:
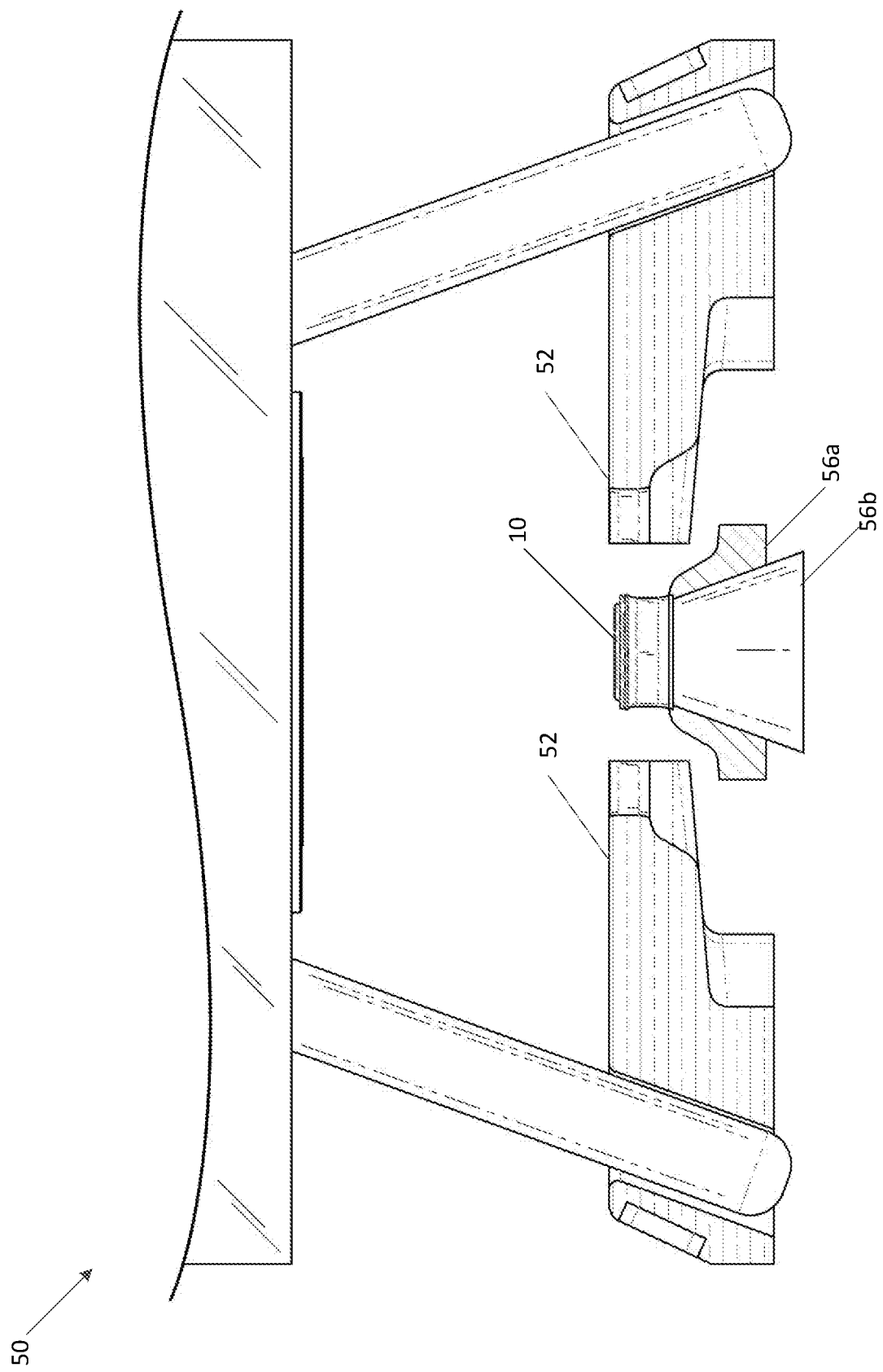
FIG. 6 is a side sectional view of a tool of one embodiment of the present disclosure, the tool being in an expanded state.
Figure 7:
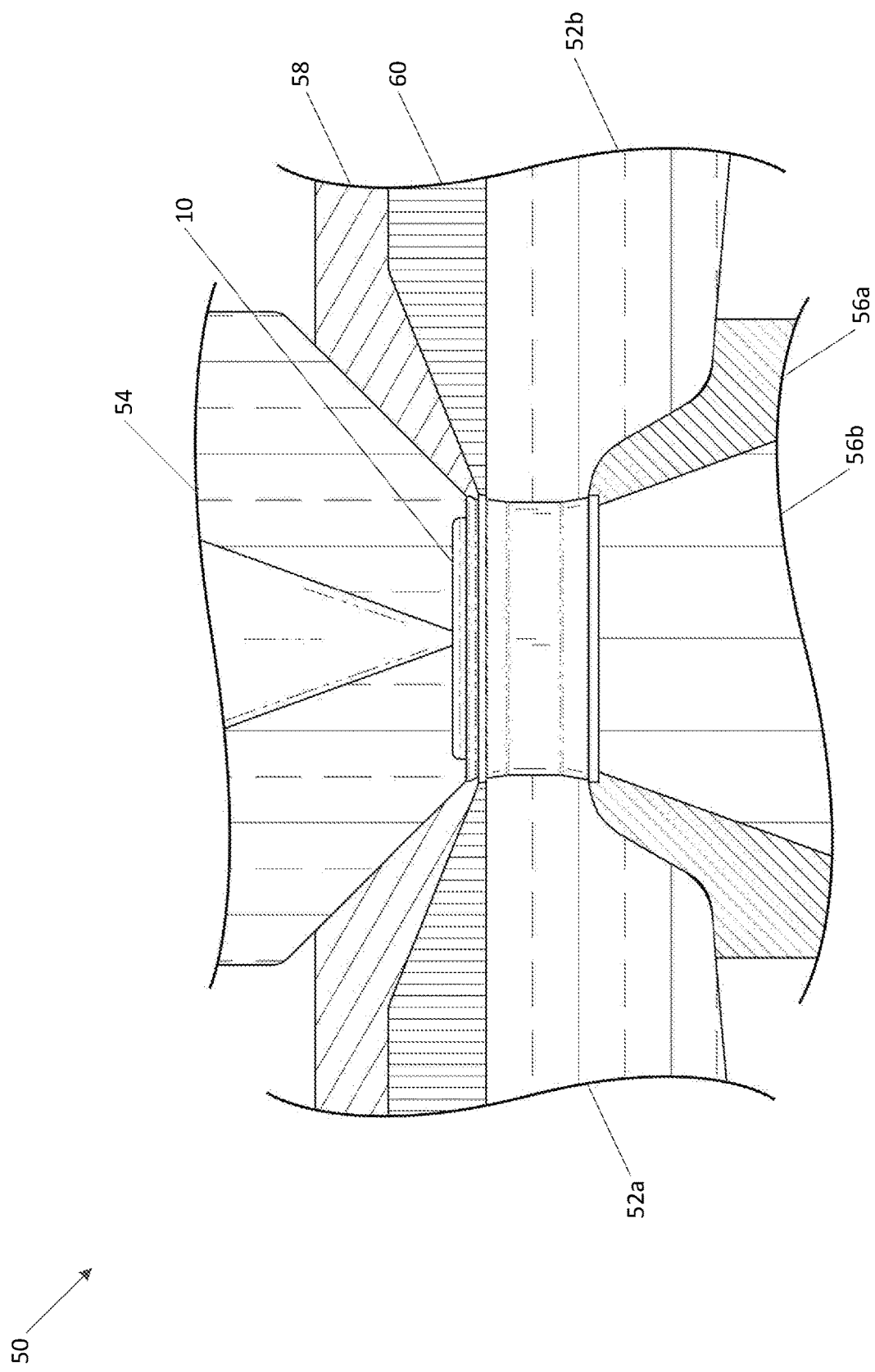
FIG. 7 is a side sectional view of the tool in a closed state.

With reference to FIGS. 6 and 7, there is shown a tool 50 according to a preferred embodiment of the present disclosure. The tool 50 is configured for forming a piston having a plurality of circumferential seals for use in a cartridge for dispensing multi-part fluids. In one embodiment, the tool 50 is configured for forming piston 10 and in another embodiment, tool 50 is configured for forming piston 30. For simplicity, the following description is in respect of forming piston 10, though it will be appreciated that it equally applies to piston 30.

The tool 50 comprises a plurality of segments together defining a piston cavity corresponding to an outer periphery of the piston 10. The segments include central segments 52a, 52b, rearward segments 56a, 56b, a forward segment 54, and at least a pair of intermediate segments 58, 60.

The central segments 52a, 52b are transversely movable and meet in a longitudinal plane so as to together define a generally cylindrical main body cavity for forming a circumferential outer portion of the piston 10. A longitudinal axis of the main body cavity defines a tool draw axis for the rearward segments 56a, 56b, the forward segment 54, and the intermediate segments 58, 60, which are all axially movable along the longitudinal axis with respect to each other.

The rearward segments 56a, 56b are configured for forming at least a rear end of the piston 10. This may include a rearward face, along with internal cavities and strengthening ribs. Although a pair of rearward segments 56a, 56b are shown, it will be appreciated that a single rearward segment may also be used. Such an arrangement may include a plurality of ejector pins movable within the segment to facilitate ejection of the piston 10 from the tool 50.

Rearward segment 56b is configured to form a portion of the rear end that includes internal cavities and strengthening ribs. Rearward segment 56a is configured to engage the central segments 52a, 52b to at least partially form the rear seal 16. In this regard, rearward segment 56a meets the central segments 52a, 52b at a forward end of the rear seal 16 to form a sealing edge. Advantageously, the rear seal 16 is formed with a circumferential parting line at the forward end of the seal and any flashing that occurs at this point will not be detrimental to the sealing performance of the piston 10. This arrangement also provides that the rear seal 16 can be formed without transverse parting lines that require post forming machining operations to be performed to prevent leakage of the seal.

Forward segment 54 is configured for forming at least a forward end of the piston. This may include a forward face, along with internal cavities and strengthening ribs.

Intermediate segments 58 and 60 are disposed intermediate the forward segment 54 and the central segments 52a, 52b. The first intermediate segment 58 is disposed adjacent the forward segment 54 and configured so that the forward segment 54 and the first intermediate segment 58 together form a deflection member 12. The second intermediate segment 60 is disposed adjacent the central segments 52a, 52b and configured so that the second intermediate segment 60 and the central segments 52a, 52b together form a first or forward sealing edge on a periphery of a forward piston seal, i.e. the forward seal 14.

Advantageously, the forward seal 14 is formed with a circumferential parting line at the forward end of the seal and any flashing that occurs at this point will not be detrimental to the sealing performance of the piston 10. This arrangement also provides that the forward seals 14 can be formed without transverse parting lines that require post forming machining operations to be performed to prevent leakage of the seal.

Figure 11:
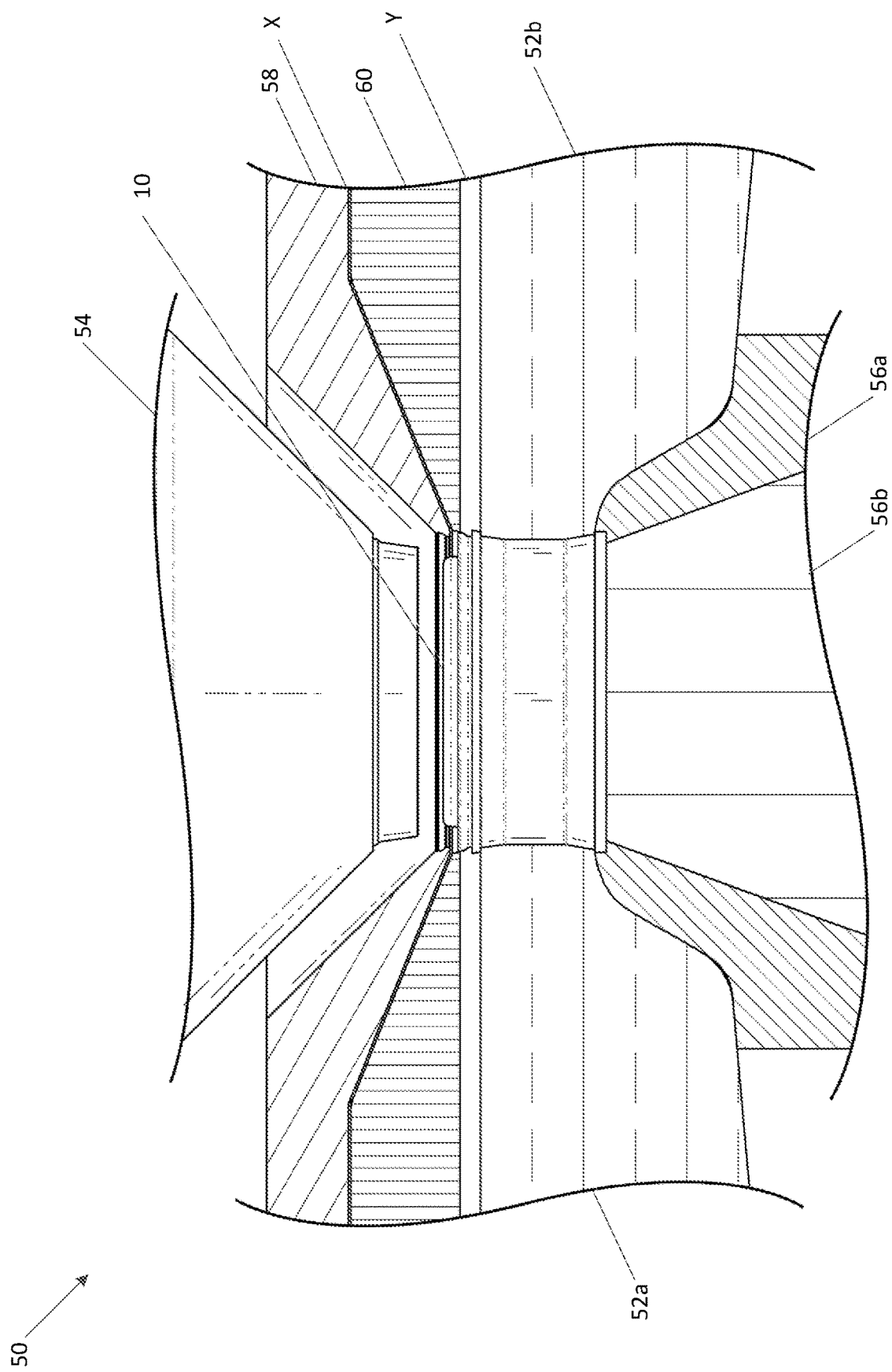
FIG. 11 is a side sectional view of the tool showing first and second intermediate segments in a partially advanced state.

The first intermediate segment 58 is configured so that a portion thereof extends behind the deflection member 12 in the tool draw axis to form an undercut. Similarly, a portion of the second intermediate segment 60 is configured to extend behind the forward seal 14 in the tool draw axis to form an undercut. To facilitate removal of a formed piston 10 from the tool 50, the first and second intermediate segments 58, 60 are separable in the longitudinal direction a relatively small distance X (see FIG. 11), which is preferably in the range of 0.1 mm to 0.8 mm. In use, the first intermediate section 58 urges the deflection member 12 radially inward to deflect the forward seal 14 inwardly to allow removal of the second intermediate segment 60 over the forward seal 14. Advantageously, although the tool 50 is formed with undercuts, the piston 10 can easily be removed from the tool with minimal damage. Also, separation of the first and second intermediate segments 58, 60 allows for upward deflection of the forward seal 14 during removal of the piston 10 from the tool 50.

Although undercuts are typically avoided in injection molding tools, the inventor has found that the described tool configuration can allow a piston having undercuts to be successfully removed without being damaged. Also, using the tool in accordance with the described method can allow a piston having undercuts to be molded and then successfully removed from the tool without being damaged.

The operation of tool 50 will now be described with reference to FIGS. 7 to 12.

Figure 8:
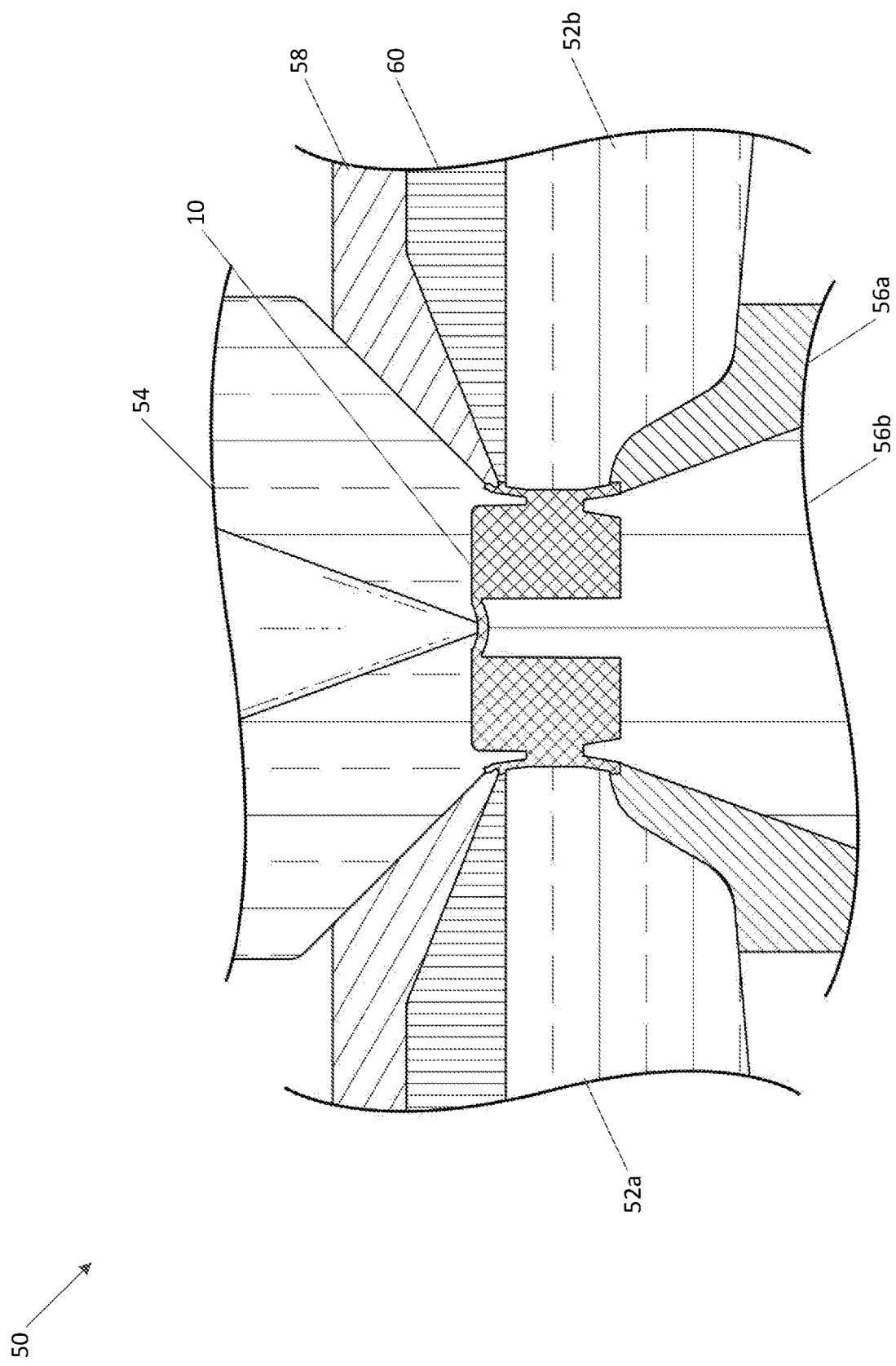
FIG. 8 is another side sectional view of the tool showing the piston in a sectioned form.
Figure 9:
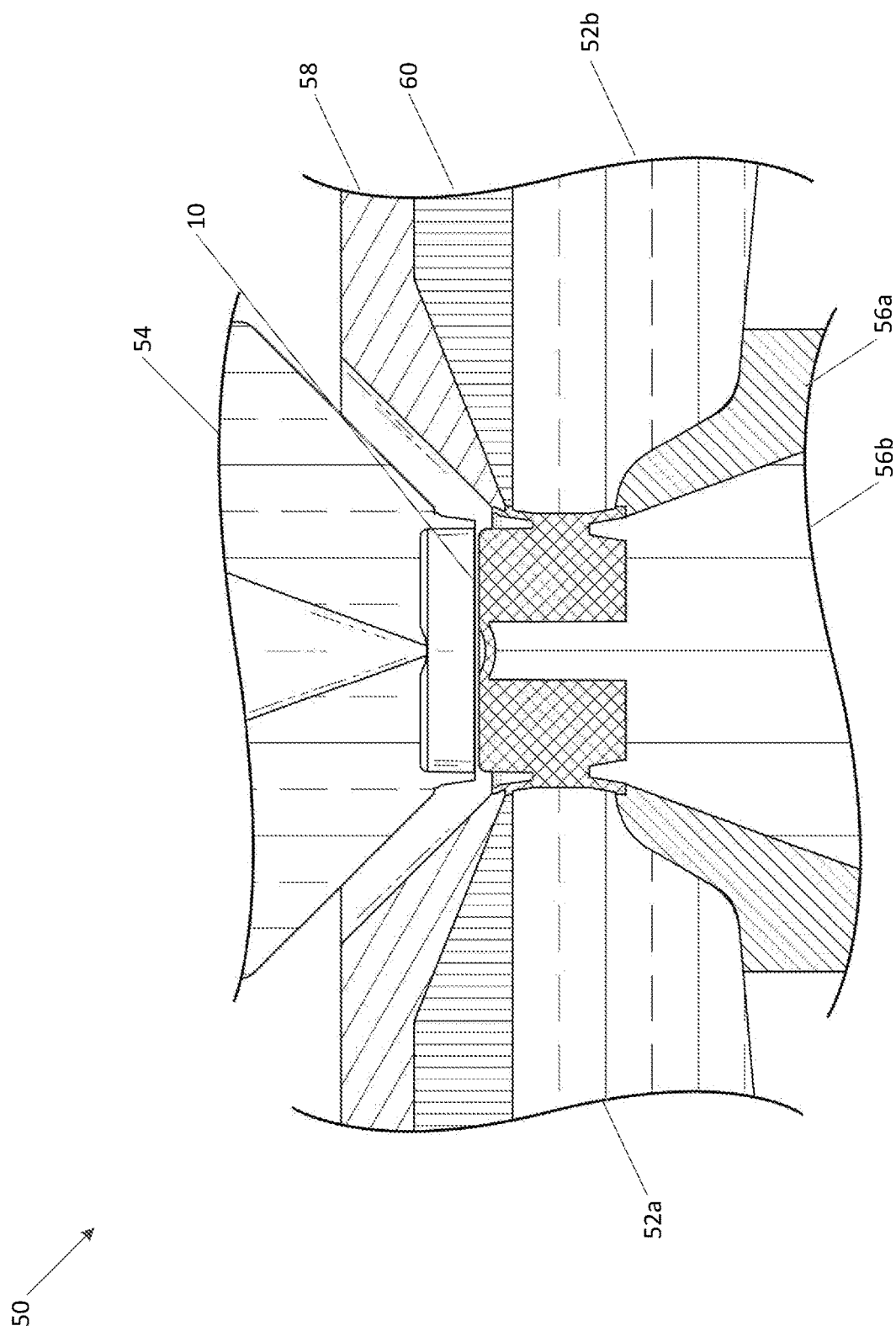
FIG. 9 is a side sectional view of the tool showing a forward segment in a partially advanced state.
Figure 10:
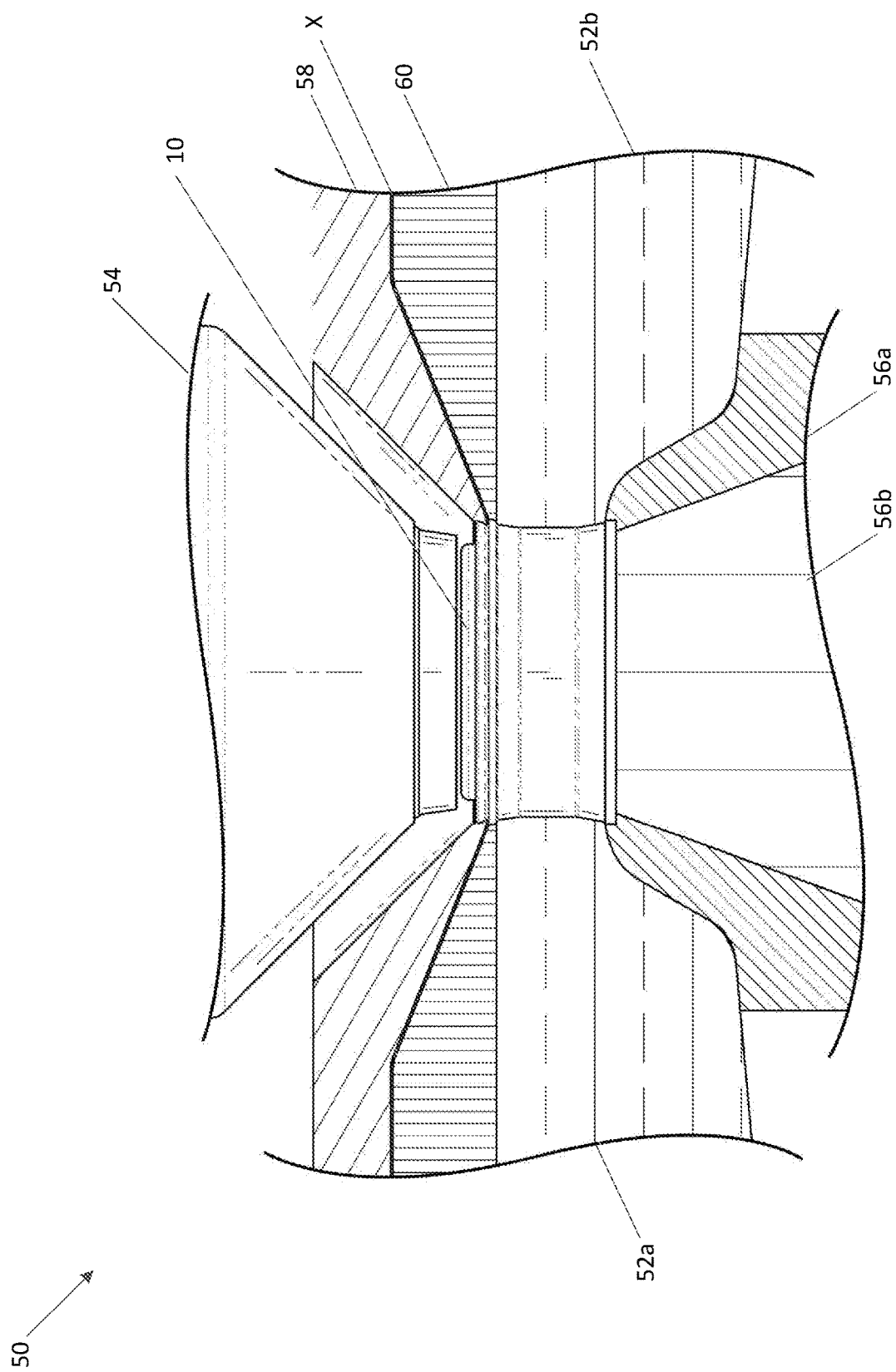
FIG. 10 is a side sectional view of the tool showing first and second intermediate segments separated.

Initially, the tool 50 is brought into a closed state defining a piston cavity, as illustrated in FIGS. 7 and 8. In this condition, segments of the tool 50 are brought into engagement with each other and forcibly held in position while plastic material is injected into the cavity under pressure.

Molding of the piston 10 is performed using molding parameters common to best practices in the art. Following injection of the plastic material, the piston is allowed to at least partially cure. In some embodiments, while the material is still elastically deformable, yet has sufficient strength to maintain its physical form the forward segment 54 and intermediate segments 58, 60 are removed. In other embodiments, the forward segment 54 and intermediate segments 58, 60 are removed when the material is mostly set.

By removing the intermediate segments 58, 60 while the material is still relatively hot and still elastically deformable, portions of the piston 10 formed with an undercut can flex to permit passage of the intermediate sections 58, 60. Accordingly, the intermediate sections 58, 60 can be removed from the tool, thereby allowing the piston 10 to be ejected once additional cooling has occurred. Furthermore, the time of performing a molding cycle can be greatly reduced so that manufacturing productivity can be improved.

In other embodiments, the piston can be allowed to completely cure before removal from the tool. So as to facilitate passage of the intermediate section 60 over the forward seal 14 without damaging the forward seal 14, the piston cavity is configured so that the deflection member 12 curves from its base toward its tip at the end which is forward in use, which allows the deflection member 12 to engage the intermediate section 58 during removal to cause the deflection member 12 to flex radially inwardly during removal of the intermediate section 58, causing the forward seal to be drawn inwardly so that intermediate section 60 can pass over the forward seal 14. Although the deflection member 12 is shown as having first and second curves, it will be appreciated that a single curve may be provided.

To facilitate activation of the deflection member 12 and passage of the second intermediate section 60 over the forward seal 14, the first and second intermediate segments 58, 60 are separated a small amount by advancing the first intermediate segment 58 a small distance X (see FIG. 11), which is preferably in the range of 0.1 to 0.8 mm. This causes the intermediate section to come into contact with the deflection member 12 and urge it radially inwardly while providing a space above the forward seal 14 which allows it to flex in the forward direction so that the second intermediate segment 60 can pass over the forward seal 14. In the described embodiment, the first and second intermediate segments 58, 60 are advanced a distance Y (see FIG. 11) together to allow removal of the formed piston 10 from the tool 50.

Figure 12:
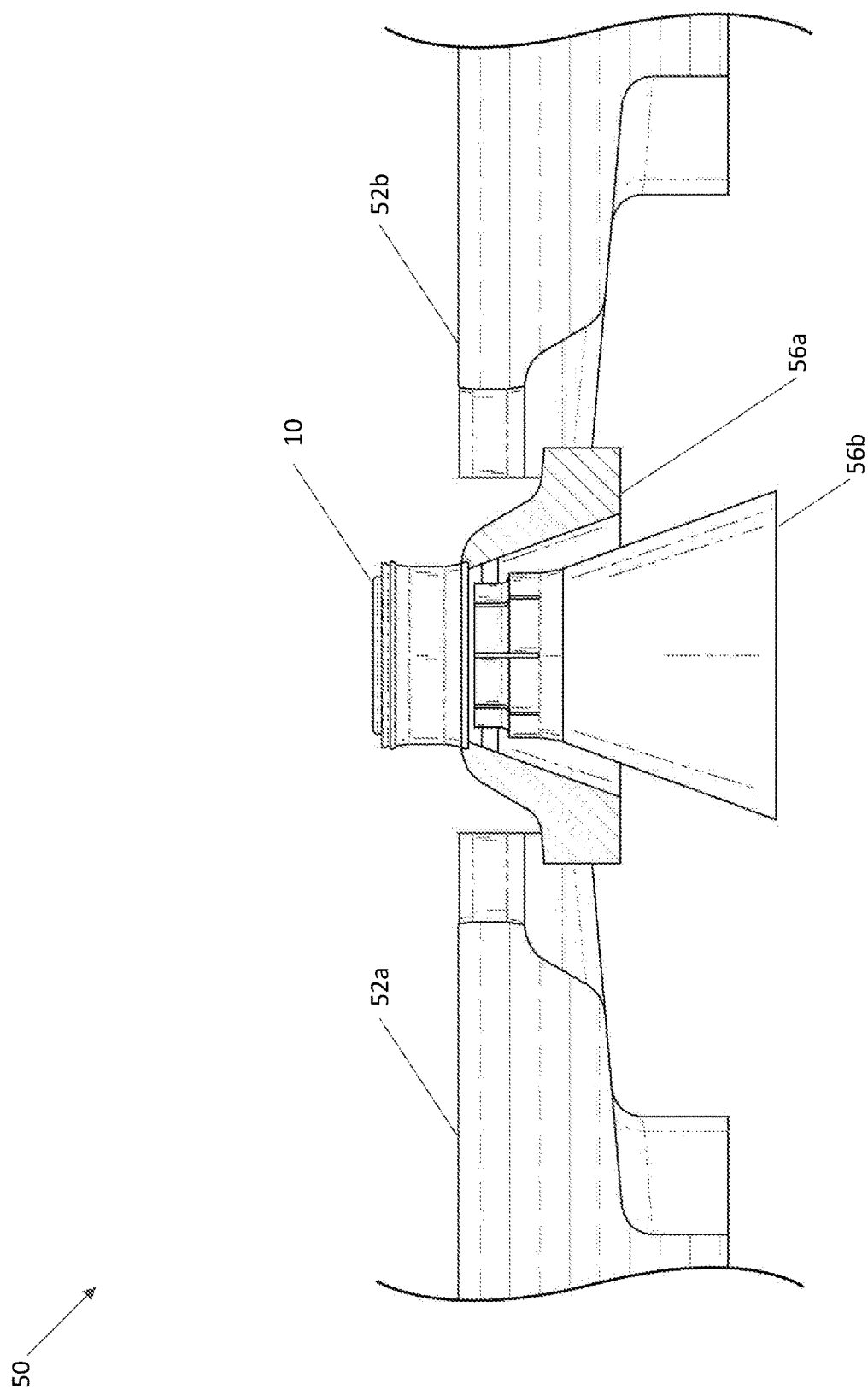
FIG. 12 is a side sectional view of the tool with forward and intermediate segments removed and showing central sections parted and a rearward segment being separated to eject a formed piston.

As illustrated in FIG. 12, the tool 50 can then move into a expanded condition to allow removal or ejection of the piston 10. In this regard, the forward segment 54 and the first and second intermediate segments 58, 60 are moved further away from the piston and the central segments 52a, 52b separated. The rearward segments 56a, 56b are then separated by either advancing or retracting either of segments 56a, 56b to allow a rearward portion to be removed from the tool 50. Alternatively, a plurality of ejection pins may be used to assist in removal of the rearward portion of the piston 10 being advance from the tool 50.

By providing a plurality of segments that can be axially withdrawn (without splitting transversely), the piston 10 may be formed without parting lines on the circumferential seals. Those skilled in the art will appreciate that forming the piston in this way allows removal of the segments of the tool while the material is either cured or largely elastically deformable, which allows the piston to be formed with undercuts yet still removable from the tool without causing damage.

The preceding description has outlined how piston 30 or an outer peripheral portion 17 of piston 10 is formed. It will be appreciated that the inner sealing portion 19, which includes a deflection member 18, a forward seal 20 and a rear seal 22, can be similarly formed using a internal core (not shown) also comprising a number of segments that are axially movable to form forward and rear seals 20, 22. A central section of the inner sealing portion 19 may be formed with a plurality of transversely collapsible segments that, in the collapsed state, can be removed without damaging seals 20, 22.

The embodiments have been described by way of example only and modifications are possible within the scope of the present disclosure.

The invention claimed is:

1. A piston for use in a cartridge for dispensing multi-part fluids, the piston comprising:
  a circumferential body;
  a rearward end extending from the circumferential body, the rearward end engageable by a piston driving element when the piston is positioned in the cartridge, the rearward end including an outwardly facing rearward circumferential seal and an inwardly facing rearward circumferential seal; and
  a forward end extending from the circumferential body, the forward end engageable by fluid stored in the cartridge when the piston is positioned in the cartridge, the forward end including:
    a forward circumferential wall longitudinally extending from the circumferential body;
    a first forward circumferential seal extending radially inwardly from the forward circumferential wall toward a longitudinal central axis of the piston, the first forward circumferential seal being a first longitudinal distance from the inwardly facing rearward circumferential seal;
    a first annular deflection member directly connected to the forward circumferential wall, the first annular deflection member longitudinally extending from the first forward circumferential seal at a first end of the first annular deflection member, the first annular deflection member forming an edge at a second end of the first annular deflection member, the first annular deflection member having an outer concave surface and an inner convex surface extending between the first end and the second end of the first annular deflection member to define an arcuate shape of the first annular deflection member, the first annular deflection member deflectable radially outwardly to assist in removal of the piston from an injection molding tool;

a second forward circumferential seal extending radially outwardly from the forward circumferential wall, the second forward circumferential seal being a second longitudinal distance from the outwardly facing rearward circumferential seal, the second longitudinal distance being greater than the first longitudinal distance; and a second annular deflection member directly connected to the forward circumferential wall, the second annular deflection member longitudinally extending from the second forward circumferential seal at a first end of the second annular deflection member, the second annular deflection member forming an edge at a second end of the second annular deflection member, the second annular deflection member having an outer convex surface and an inner concave surface extending between the first end and the second end of the second annular deflection member to define an arcuate shape of the second annular deflection member, the second annular deflection member deflectable radially inwardly towards the central longitudinal axis of the piston to assist in removal of the piston from an injection molding tool, the forward end and the rearward end being injection molded such that the forward circumferential seal and the rearward circumferential seal are monolithically formed, wherein the piston is molded in the absence of a longitudinal parting line across the forward and rearward circumferential seals.

2. The piston of claim 1, wherein the inwardly facing rearward circumferential seal and the first forward circumferential seal are coaxial.

3. A piston for use in a cartridge for dispensing multi-part fluids, the piston comprising:
 a circumferential body;
 a rearward end extending from the circumferential body, the rearward end engageable by a piston driving element when the piston is positioned in the cartridge, the rearward end including an outwardly facing rearward circumferential seal and an inwardly facing rearward circumferential seal; and
 a forward end extending from the circumferential body, the forward end engageable by fluid stored in the cartridge when the piston is positioned in the cartridge, the forward end including:
  an outer annular deflection member connected to the circumferential body, the outer annular deflection member longitudinally extending from the circumferential body at a connected end of the outer annular deflection member, the outer annular deflection member having a free end forming an edge opposite the connected end, the outer annular deflection member having an outer convex surface and an inner concave surface extending between the connected end and the free end of the outer annular deflection member to define an arcuate shape of the outer annular deflection member, the outer annular deflection member deflectable radially inwardly in a direction toward the central longitudinal axis of the piston to assist in removal of the piston from an injection molding tool;
  a first forward circumferential seal extending radially outwardly from the circumferential body and in a direction opposite from the central longitudinal axis of the piston, the first forward circumferential seal being adjacent to the free end of the outer annular deflection member;
  an inner annular deflection member connected to the circumferential body, the inner annular deflection member longitudinally extending from the circumferential body at a connected end of the inner annular deflection member, the inner annular deflection member having a free end forming an edge opposite the connected end, the inner annular deflection member having an outer concave surface and an inner convex surface extending between the connected end and the free end of the inner annular deflection member to define an arcuate shape of the outer annular deflection member, the inner annular deflection member deflectable radially outwardly in a direction opposite the central longitudinal axis of the piston to assist in removal of the piston from an injection molding tool; and
  a second forward circumferential seal extending radially inwardly from the circumferential body and in a direction toward the central longitudinal axis of the piston, the second forward circumferential seal being adjacent to the free end of the inner annular deflection member,
 the forward end and the rearward end being injection molded such that the forward circumferential seal and the rearward circumferential seal are monolithically formed, wherein the piston is molded in the absence of a longitudinal parting line across the forward and rearward circumferential seals.

4. A piston for use in a cartridge for dispensing multi-part fluids, the piston comprising:
 a forward end engageable by fluid stored in the cartridge when the piston is positioned in the cartridge, the forward end including: (i) an outer forward circumferential seal extending radially outwardly in a direction opposite to a central longitudinal axis of the piston, (ii) an inner forward circumferential seal extending radially inwardly in a direction toward the central longitudinal axis of the piston, wherein the shapes of the outer forward circumferential seal and the inner forward circumferential seal are mirror images of each other, (iii) an outer annular deflection member connected to and adjacent to the outer forward circumferential seal at a first end of the outer annular deflection member, the outer annular deflection member forming a first edge at a second end of the outer annular deflection member, the outer annular deflection member having an outer convex surface and an inner concave surface extending between the first end and the second end of the outer annular deflection member to define an arcuate shape of the outer annular deflection member, the outer annular deflection member deflectable radially inwardly, and (iv) an inner annular deflection member connected to and adjacent to the inner forward circumferential seal at a first end of the inner annular deflection member, the inner annular deflection member forming a second edge at a second end of the inner annular deflection member, the inner annular deflection member having an inner convex surface and an outer concave surface extending between the first end and the second end of the inner annular deflection member to define an arcuate shape of the inner annular deflection member, the inner annular deflection member deflectable radially outwardly in a direction opposite to the central longitudinal axis of the piston; and a rearward end engageable by a piston driving element when the piston is positioned in the cartridge, the rearward end including an outer rearward circumferential seal and an inner rearward circumferential seal opposing the outer rearward circumferential seal, the outer forward circumferential seal, the inner forward circumferential seal, the outer rearward circumferential seal, and the inner rearward circumferential seal being injection molded such that the outer forward circumferential seal, inner forward circumferential seal, the outer rearward circumferential seal, and the inner rearward circumferential seal are monolithically formed, wherein the piston is molded in the absence of a longitudinal parting line across the outer forward circumferential seal, the inner forward circumferential seal, the outer rearward circumferential seal, and the inner rearward circumferential seal.

\* \* \* \* \*